United States Patent [19]

Takeuchi et al.

[11] Patent Number: 5,432,309
[45] Date of Patent: Jul. 11, 1995

[54] AUTOMATIC VENDING MACHINE AND DOOR SWITCH APPARATUS

[75] Inventors: Masanori Takeuchi; Takayuki Nishioka, both of Kawasaki, Japan

[73] Assignee: Fuji Electric Co., Ltd., Kanagawa, Japan

[21] Appl. No.: 139,121

[22] Filed: Oct. 21, 1993

[30] Foreign Application Priority Data

Oct. 22, 1992 [JP] Japan .................. 4-283333
Sep. 9, 1993 [JP] Japan .................. 5-224064

[51] Int. Cl.⁶ .................. H01H 3/16; H01H 13/10
[52] U.S. Cl. .................. 200/61.62; 200/334
[58] Field of Search .............. 200/61.62, 61.69, 61.80, 200/61.81, 61.82, 61.76, 61.78, 61.79, 333, 334

[56] References Cited

U.S. PATENT DOCUMENTS

| | | | |
|---|---|---|---|
| 2,408,213 | 9/1946 | Huber | 200/61.69 |
| 2,957,567 | 10/1960 | Doud | 200/61.62 X |
| 3,621,165 | 11/1971 | Stone | 200/61.62 |
| 3,849,615 | 11/1974 | Fisher | 200/61.81 |
| 4,686,336 | 8/1987 | Sorenson | 200/61.76 X |
| 5,077,631 | 12/1991 | Cleary | 361/192 |

FOREIGN PATENT DOCUMENTS

| | | | |
|---|---|---|---|
| 2815300 | 10/1979 | Germany | H01H 13/18 |
| 3923663A1 | 1/1991 | Germany | H01H 13/18 |
| 1407306 | 9/1975 | United Kingdom | H02H 5/00 |
| 2135826 | 9/1984 | United Kingdom | H01H 13/18 |
| 2195499 | 4/1988 | United Kingdom | H01H 13/18 |

OTHER PUBLICATIONS

Communication issued by European Patent Office dated Oct. 28, 1994, including European Search Report.

Primary Examiner—J. R. Scott
Attorney, Agent, or Firm—Finnegan, Henderson, Farabow, Garrett & Dunner

[57] ABSTRACT

A door switch apparatus is provided in an automatic vending machine to cut off electric power to exposed electrical devices mounted on the inside face of the vending machine's service door when the door is opened. The switch is constructed with safeguard members to protect against inadvertent contact by a service person, ensuring that the exposed electrical devices will not be electrified until the service person closes the service door.

6 Claims, 3 Drawing Sheets

AUTOMATIC VENDING MACHINE AND DOOR SWITCH APPARATUS

BACKGROUND OF THE INVENTION

1. Field of The Invention

This invention relates to an automatic vending machine and a door switch apparatus that cuts off electric power to exposed internal circuits when the automatic vending machine door is opened.

2. Discussion of The Related Art

A vending machine that is known in the art has a door switch that automatically turns the lamp in the storage compartment of the machine on or off when the door is opened or closed. FIG. 3 shows the conventional structure of such a door switch apparatus. The drawing depicts a case body 1 of the automatic vending machine; an external door 2 fitted with the front surface of the case body 1; a door switch 3, which is a plunger-type limit switch, is attached to the front portion of the case body 1 by metal fitting 4; and a switch operating unit 5 mounted on the external door opposite to plunger 3a of door switch 3. The contact point of the door switch is connected to a power source circuit of a lamp in the vending machine's storage compartment.

In the above construction, when the external door is closed, switch operating unit 5 pushes the plunger 3a of switch 3. When the external door is opened, operating unit 5 departs from plunger 3a of door switch 3 so as to enable switch 3 to close and turn on the lamp within the storage compartment.

In such automatic vending machines, various electrical devices, such as illumination lamps for displaying, switches for selecting products, a coin mechanism, an electric power source control box and the like, are mounted and exposed on the inside face of the vending machine door. The various electrical devices are connected to the electric power source leading into the case body through a harness.

While a service person cleans the inside of the machine by opening the external door, that person is in danger of receiving an electric shock if contact is made with a "live" portion, such as a wiring terminal or the like, of an exposed electric device. Accordingly, while cleaning the inside of the vending machine, an electric power source cord must be disconnected to prevent electric shock. Such precautions are, however, often not obeyed.

SUMMARY OF THE INVENTION

The present invention has been made in view of the above circumstances and has as an object to provide a safer vending machine wherein a service person is not exposed to the danger of electric shock even when coming into contact with the electric devices mounted on the inside face of the vending machine door, and a highly safe door switch for the preservation of the vending machine unit.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the automatic vending apparatus of this invention comprises a case body, a door mounted on the front surface of the case body, electrical devices mounted on the inside face of the door, and a door switch apparatus for cutting off electrical power to the electrical devices upon opening the door.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings, FIG. 1(a) is a side view of the construction of the invention. FIG. 1(b) is the cross-sectional view of FIG. 1(a) indicating the recession of the switch operating unit;

Corresponding parts are indicated by like reference numerals throughout the several views of the drawings.

DETAILED DESCRIPTION OF THE PREFERRED EMBODIMENTS

According to the present invention, the door switch apparatus comprises a plunger-shaped limit switch mounted on the front portion of the case body, a switch operating unit mounted on an external door opposite to the limit switch, and a safeguard member, also used as an insertion guide for the switch operating unit, surrounding the plunger top portion of the limit switch.

Further, in the door switch apparatus, the safeguard member surrounding the plunger which projects out from the body of the limit switch, projects out along both sides of the plunger, and comprises a pair of partition plates, the tops of which form a hook-shaped taper guide portion as a guide for the switch operating unit. The switch operating unit comprises a mounting substrate for fixing the unit to the external door, a U-shaped pusher rod whose leg portion is movably fitted on the mounting substrate, and a pushing spring for pushing the pusher rod into the limit switch.

In the above construction, the door switch turns on or off when the door is opened or closed, cutting off the electric power to various electric devices mounted on the inside face of the door. Accordingly, a service person is completely free from the danger of electric shock when working to clean the storage compartment of the vending machine even if contact is made with the electric devices, thus increasing safety.

A safeguard member, projecting out from a limit switch and surrounding the plunger of the switch, prevents one's hand from directly touching the plunger of the switch, and further, when the external door is closed, the safeguard member acts as a guide correcting any slight misalignment of the pusher rod of the switch operating unit.

Figure 1A:
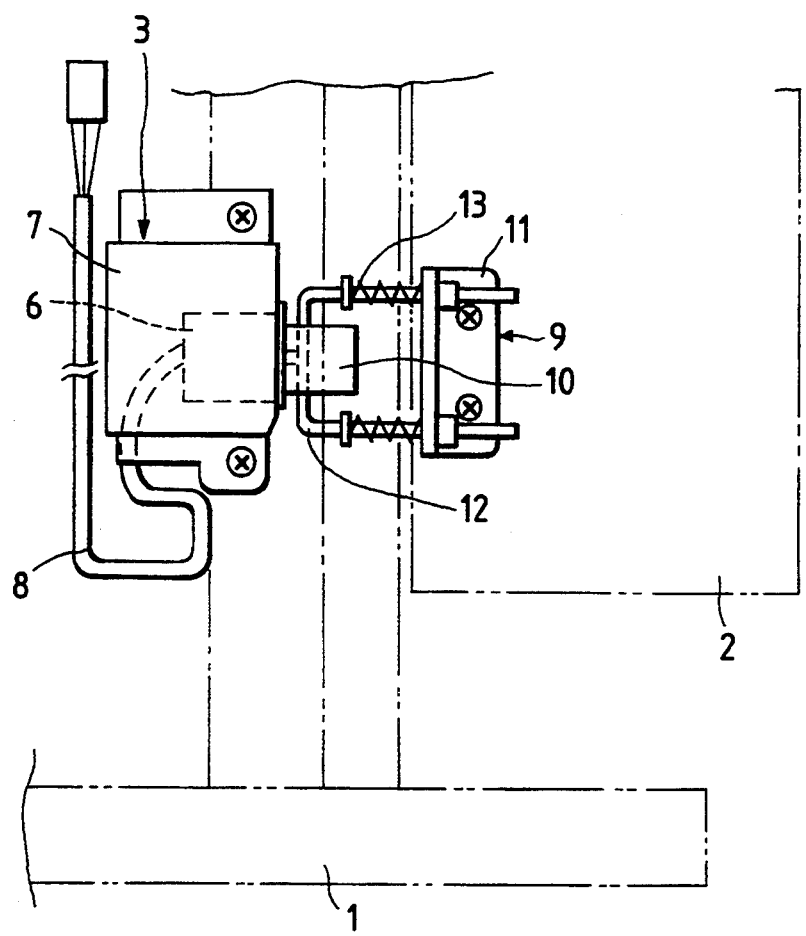
FIGS. 1(a) and 1(b) are views, particularly in diagrammatic form, of a door switch apparatus representing an embodiment of the invention.
Figure 1B:
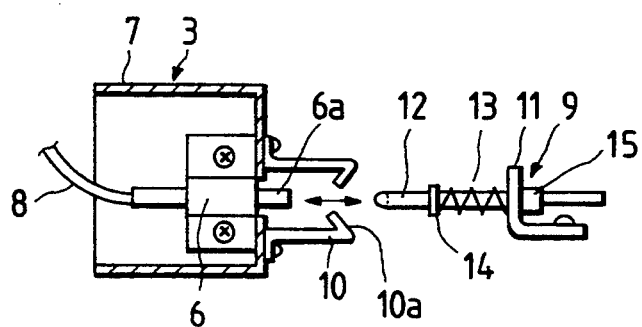
Figure 2:
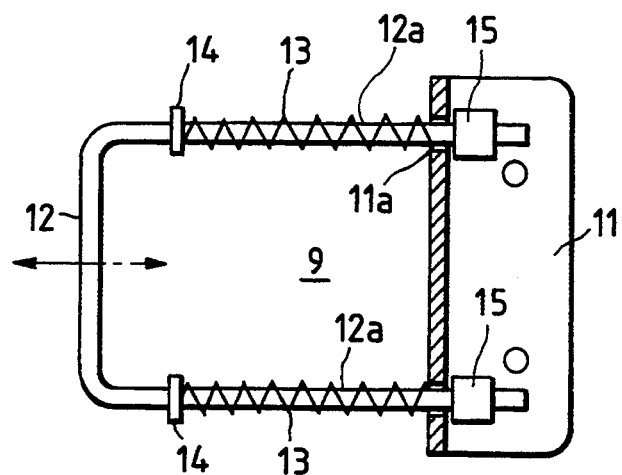
FIG. 2 is an enlarged plan of the switch operating unit of FIG. 1.
Figure 3:
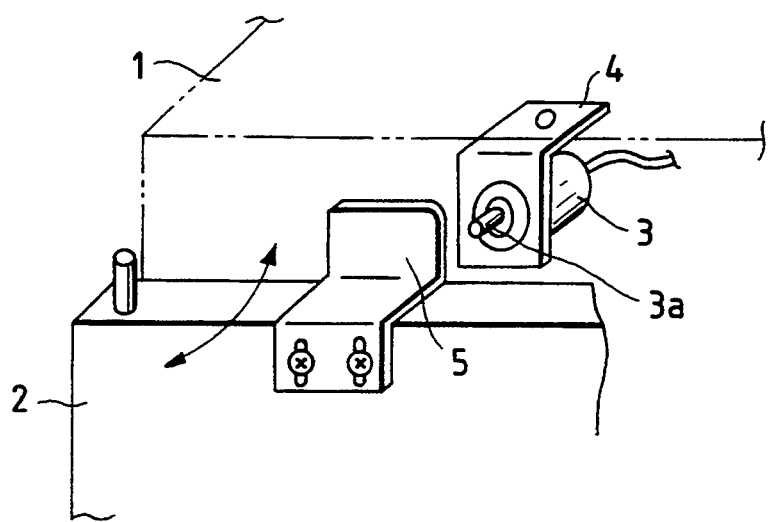
FIG. 3 is a perspective view of a conventional door switch mounted on an automatic vending machine.

In FIGS. 1(a), 1(b), and 2, door switch 3, the limit switch of which is stored in a switch case 7, is mounted on the front of the case body 1. A plunger or actuator 6a of limit switch 6 projects out from the front of the switch case 7, as seen in FIG. 1(b). In addition, reference number 8 indicates lead wires directed from switch 6. A switch operating unit 9 is mounted on the external door 2 opposite door switch 3.

Further, a pair of safeguard members 10, also used as an insertion guide for the switch operating unit, are mounted on the door switch 3 in positions to the left and right of plunger 6a which projects out from the switch case 7. The safeguard members are a pair of partition plates, the free end portions of which are turned toward each other and bent into hooks, thereby providing taper portions 10a acting as insertion guides of a pusher rod described below. The safeguard members are fixed on the front surface of the switch case 7 by screws.

In addition, as specifically shown in FIG. 2, the switch operating unit 9 comprises an L-shaped mounting substrate 11 fixed to the external door 2 and a U-shaped pusher rod 12 mounted by the mounting substrate with leg portions 12a of the pusher rod inserted through holes at the top and bottom end of the mounting substrate 11. Compressed coils 13 acting as pusher springs, through which leg portions 12a extend, act between pusher rod 12 and the mounting substrate 11 to bias the pusher rod toward the door switch 3. Reference numerals 14 and 15 indicate, respectively, a bearer and a stop piece preventing pusher rod 12 from detaching from the switch operating unit assembly.

Figure 4:
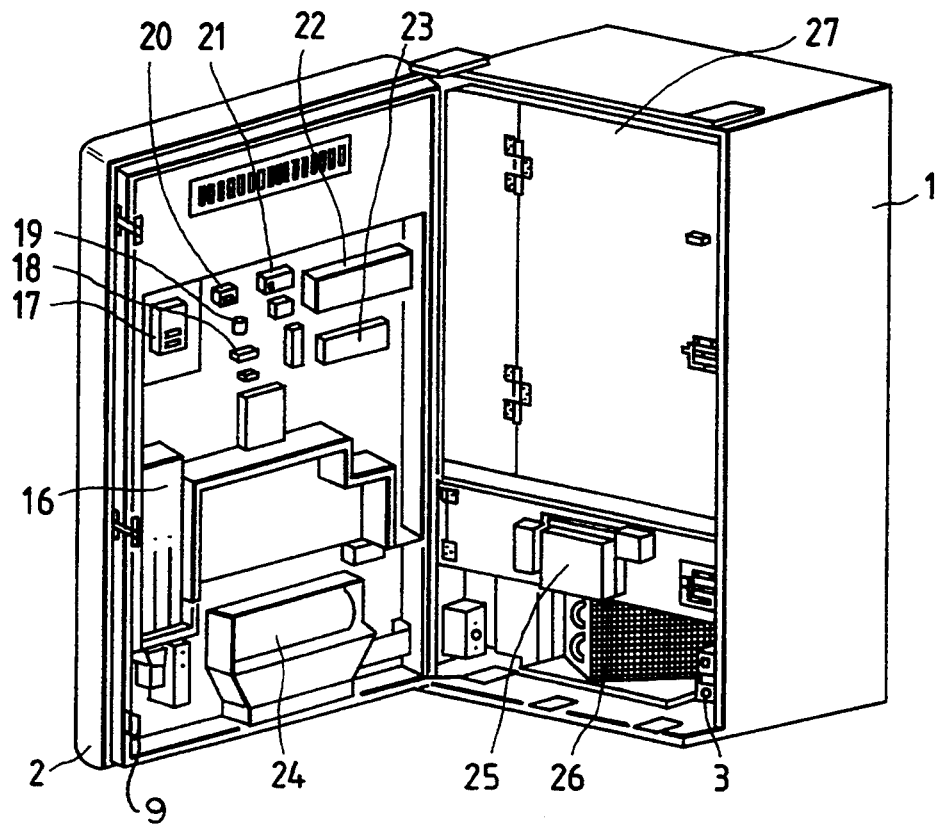
FIG. 4 is a perspective view of a vending machine with its external door opened.
Figure 5:
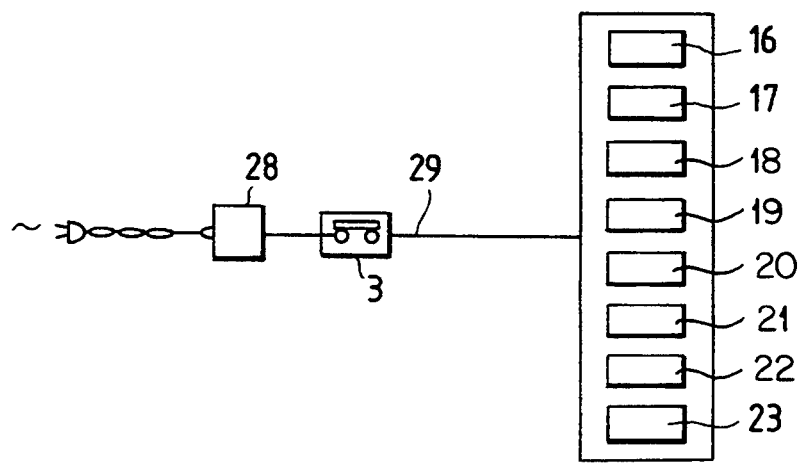
FIG. 5 is a diagram of a summary wiring circuit between the various electric devices mounted on the external door of the vending machine and the power supply.

Next, the construction of the inside of the vending machine is shown in FIG. 4. A summary of a wiring circuit between the various electric devices mounted on the inside face of the vending machine door and the power source is shown in FIG. 5. First, in FIG. 4, various electric devices, such as a coin mechanism 16, a keyboard 17 for setting price displays, a total counter 18 for displaying the amount of products purchased, a malfunction releasing switch 19, monitor lamp box 20, switch 21 of a fluorescent lamp for display, an electric power source control box 22, a relay box 23, and the like, are mounted on the inside face of the external door 2. In addition, several other devices are indicated: a product outlet 24; a product conveying door 25 connecting the product outlet 24; and a product rack (not shown) stored in the case body 1; an air conditioning unit 26; and an internal door 27 covering the front surface of the product rack. As shown in FIG. 5, a power source circuit 29, running between the various electrical devices 16–23 and a terminal box 28 of the power source, leads to the inside of the machine using a commercial power source at 100–220 V.

According to the above construction, if the external door is opened while the vending machine is working, pusher rod 12 of the switch operating unit 9 pushes the plunger 6a of the limit switch 6, turning off door switch 3, thereby cutting off the transmission of electricity to the various electrical devices. Further, in this case, because of the safeguard members 10, disposed on the left and right sides of door switch 3 and flanking the plunger 6a of the limit switch 6, there is no possibility that the limit switch will fail to turn off the electric devices mounted on the external door even if a service person touches the door switch. Accordingly, even if the service person comes in contact with the electrical devices during maintenance work, such as cleaning the inside of the machine, there is no chance of electric shock.

On the other hand, when the external door is closed, the pusher rod 12 of switch operating unit 9 depresses plunger 6a of limit switch 6. Such switch action turns on the electric devices mounted on the external door, thereby returning the vending machine to its operating state.

In this embodiment, as described above, pusher rod 12 of switch operating unit 9 is movably fixed so as to be capable of tilting left and right, and is supported so as to be capable of moving forward and backward through the springs 13. Furthermore, in the process of closing external door 2, the right or outer portion of the pusher rod 12 is inserted between and guided by the taper portions 10a of safeguard members 10 mounted on the side of the door switch 3. Accordingly, if there is a slight construction error in the mounting position of switch operating unit 9, the taper portion 10a of the safeguard members 10 compensates for such an error, ensuring that the outer portion of the pusher rod 12 depresses plunger 6a of the limit switch 6.

As described above, the advantages of the invention are as follows:

1. By virtue of the construction of the invention, when the external door is opened during maintenance of the vending machine, the door switch automatically turns off the power source circuit of the various electric devices mounted on the external door. Accordingly, a service person is free from the danger of electric shock while working, even if contact is made with the electric devices mounted on the external door.

2. With respect to the door switch apparatus, when the door is open, by virtue of the safeguard members, the door switch is incapable of malfunction even if one inadvertently bumps against the switch apparatus, thereby providing further safety.

3. Further, since the invention protects against construction errors in the switch operating unit, the reliability of the switch operating unit is increased.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An automatic vending apparatus comprising:
   a case body having a front surface;
   a door, having an inside face, mounted on the front surface of said case body;
   electrical devices mounted on the inside face of said door;
   a limit switch having a plunger and a switch case and mounted on the front surface of said case body;
   safeguard means partially surrounding an end of said plunger of said switch and projecting out from said switch case for preventing unintended contact with and operation of said switch; and switch operating means mounted on said door opposite said switch for depressing the plunger and thus operating said limit switch when said door is closed.

2. The automatic vending apparatus of claim 1, wherein said safeguard means projects out from the switch case of said limit switch along sides of said plunger and comprises a pair of partition plates, said plates having free ends providing hook-shaped, tapered guide portions for guiding said switch operating unit during closure of said door.

3. The automatic vending apparatus of claim 1, wherein said switch operating means comprises a mounting substrate mounted on said door, a U-shaped pusher rod whose leg portions are movably fitted to said mounting substrate, and at least one coil spring acting between the pusher rod and the mounting substrate for biasing said pusher rod toward said limit switch.

4. A door switch apparatus for an automatic vending apparatus having a case body and a door mounted on the front surface of the case body, electrical devices mounted on the inside face of the door, said door switch apparatus comprising:

- a limit switch having a plunger and a switch case;
- safeguard means partially surrounding an end of said plunger of said switch and projecting out from said switch case for preventing unintended contact with and operation of said switch; and
- switch operating means mounted opposite said switch for depressing the plunger and thus operating said limit switch when the door is closed.

5. A door switch apparatus according to claim 4, wherein said safeguard means projects out from the switch case of said limit switch along sides of said plunger and comprises a pair of partition plates, said plates having free ends providing hook-shaped, tapered guide portions for guiding said switch operating means during closure of the door.

6. A door switch apparatus according to claim 4, wherein said switch operating means comprises a mounting substrate, a U-shaped pusher rod having leg portions movably fitted to said mounting substrate, and at least one coil spring acting between the pusher rod and the mounting substrate for biasing said pusher rod toward said limit switch.

* * * * *